United States Patent
Overkott

[11] 3,870,381
[45] Mar. 11, 1975

[54] GLAND ASSEMBLY

[75] Inventor: Franz Josef Overkott, Gevelsberg, Germany

[73] Assignee: Dr. Carl Ullrich Peddinghaus, Wuppertal-Barmen, Germany

[22] Filed: Mar. 12, 1973

[21] Appl. No.: 339,996

[30] Foreign Application Priority Data
Mar. 15, 1972 Germany.......................... 2212471

[52] U.S. Cl...................... 308/3.5, 92/165, 92/168
[51] Int. Cl. ........................................... F16c 77/00
[58] Field of Search ........ 308/3.5, 4 R; 92/165, 168

[56] References Cited
UNITED STATES PATENTS

| | | | |
|---|---|---|---|
| 2,489,769 | 11/1949 | Flick | 308/3.5 |
| 2,713,522 | 7/1955 | Petch | 308/3.5 |
| 2,798,778 | 7/1957 | Flick | 92/168 |
| 3,104,916 | 9/1963 | Dowling | 308/3.5 |
| 3,227,497 | 1/1966 | Heckethorn | 308/3.5 |
| 3,307,883 | 3/1967 | Wustenhagen | 308/3.5 |
| 3,692,272 | 9/1972 | Radke | 308/3.5 |
| 3,724,211 | 4/1973 | Julow | 308/3.5 |
| 3,776,610 | 12/1973 | Harvey | 308/3.5 |

*Primary Examiner*—Charles J. Myhre
*Assistant Examiner*—R. H. Lazarus

[57] ABSTRACT

A gland assembly for use in providing a seal between a piston rod and the end of a cylinder of a piston and cylinder unit, the assembly being of the kind having an annular seal formed of resilient material, wherein there is provided a guide bush through which in use the piston rod will extend, said guide bush having an axially extending portion connected at one end to a radially extending flange and there being also provided a pair of annular retaining members which are arranged so that their inner surfaces are respectively engaged with the outer peripheral surfaces of said axially extending portion and said radially extending flange of the guide bush whereby said guide bush connects together said annular retaining members, one of said annular retaining members being formed with a recess in which said seal is located.

1 Claim, 1 Drawing Figure

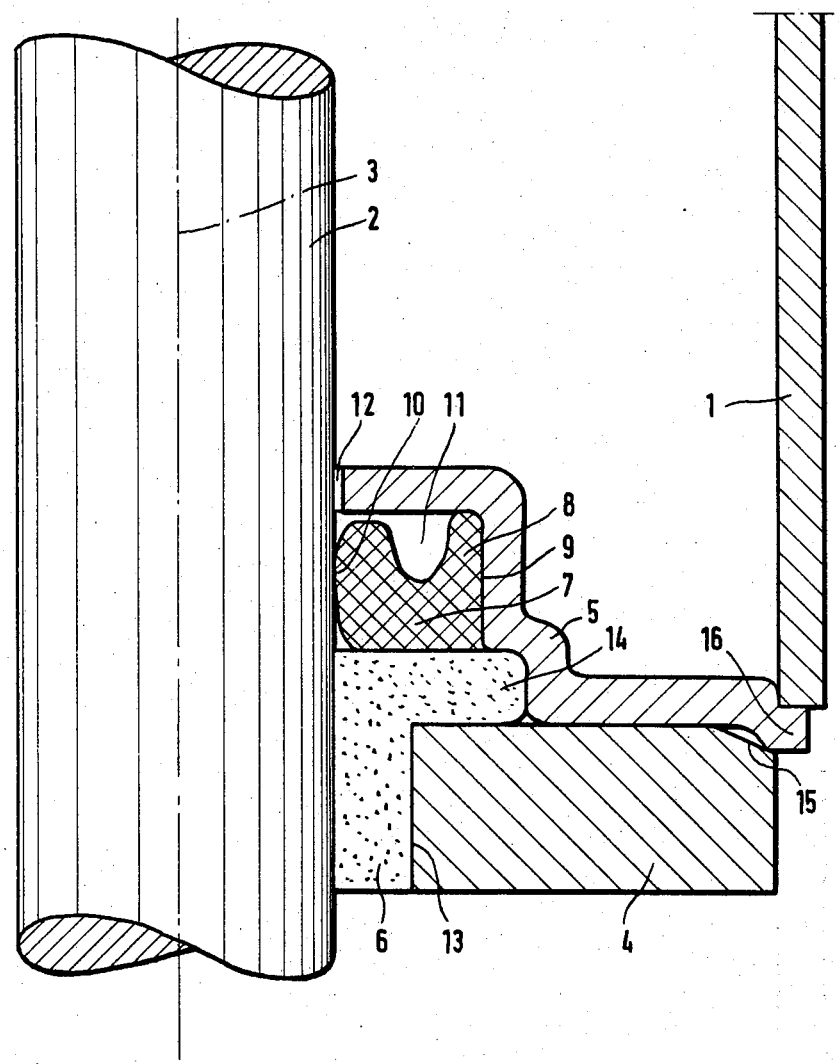

GLAND ASSEMBLY

The invention relates to a gland assembly for use in providing a seal between a piston rod and the end of a cylinder of a piston and cylinder unit, more particularly (but not exclusively) a hydropneumatic shock absorber.

Hitherto, the end of the cylinder of such a unit is usually provided with means for securing an inner annulus, so that with the piston and piston rod inserted, after the inner annulus has been introduced, a seal is first of all placed in position and then a guide bush is assembled, said bush finally being secured in the cylinder by means of further holding means. The manufacture of an arrangement of this kind is not only very costly, because it is not possible to pre-assemble said parts before they are introduced into the cylinder, but in addition the arrangement is very expensive because of the individual parts which are used. It is for instance preferable to use sintered material for the guide bush, said material being saturated with lubricants to give a good sliding ability. This means therefore that the guide bush cannot be connected to the cylinder wall by means of welding. Moreover, since all parts must be brought into a centralised position, the possibility of automating the manufacturing process is limited.

The object of the present invention is to provide an improved gland assembly which overcomes these disadvantages.

In accordance with the invention, there is provided a gland assembly for a piston rod of a piston and cylinder unit, said assembly being of the kind incorporating an annular seal formed of resilient material, characterised in that the assembly is provided with a guide bush having an axially extending portion and a radially extending flange, together with a pair of annular retaining members, the exterior surface of said axially extending portion of said guide bush engaging the inner surface of one of said annular retaining members to locate said one retaining member and the outer peripheral surface of said radially extending flange of the guide bush engaging the inner surface of the other annular retaining member to locate said other retaining member, said annular seal being itself disposed within a recess formed in said other annular retaining member.

With the above-described construction, the gland can be fully pre-assembled so that its individual parts are already centred on the guide bush. Both the guide bush and the seal can be manufactured from a relatively small quantity of material because they do not have to be any larger in size than is absolutely necessary according to their function. Where the gland assemblies are to be used in shock absorbers, the pre-assembled glands can be pushed as whole, units on to the piston rods, thus reducing assembling costs. Further, by connecting the gland assembly to the cylinder, its parts can be accurately centered in relation to the cylinder and the piston rod. A welding process can be used to effect the connection.

The two annular retaining members are conveniently connected together through the guide bush by means of push fits.

The invention will now be more particularly described with reference to the accompanying drawing which is a half sectional view of one example of a gland assembly constructed in accordance with the invention, the assembly being shown as mounted in a piston and cylinder unit with which it can be used, the drawing showing also a partial view of the piston rod and a half sectional view of the cylinder of said unit.

Referring to the drawing, the piston rod 2 of a piston and cylinder unit can be seen together with the cylinder 1 on the right hand side of the centre line 3. The gland assembly shown in the drawing comprises two annular retaining members 4 and 5, a guide bush 6 and an annular seal 7 made of resilient material and formed as shown to a U-shaped section.

The member 4, which is flat, and the member 5, which is of generally dish-shaped configuration, are both conveniently made as metal punchings or pressings. The guide bush 6 is advantageously made of a sintered metal in which a lubricant such as teflon is impregnated. Furthermore, said guide bush comprises an axially extending portion 13 and a radially extending flange 14.

During assembly of the gland, the guide bush 6 is firstly pressed into the member 4 so that the exterior of said portion 13 engages the inner surface of the member 4 as a push fit and thereby locates said member 4. Then, the seal 7 is introduced into the dish-shaped recess of the member and the latter placed over the piston rod so that outer annular limb 8 of the seal engages the inside wall 9 of said dish-shaped recess and the inner annular limb 10 of the seal engages the piston rod 2 itself. The mouth 11 of the U formed by the seal thus faces the interior of the cylinder 1 and is exposed to the pressure therein through an annular gap 12 between the piston rod and the inner edge of said member 5. The portion 13 of the guide bush 6 projects away from the interior of the cylinder 1, said portion being pressed into the annular plate 4, and clearly has a smaller outside diameter than the flange 14 which is nearer to the interior of the cylinder 1. The exterior peripheral surface of said flange 14 is similarly arranged to engage as a push fit with a part of the interior surface of the annular member 5 to retain said member 5. Thus when the guide bush 6 has been pressed into member 4 and the seal has been pressed into member 5, the two members 4 and 5 are themselves brought together so that said flange 14 engages as a push fit into member 5 and the two members 4 and 5 will then be clamped together through the guide bush 6. At the same time they are centered and this centering is improved in that the member 4 has a chamfered portion 15 on its outer part on that side thereof adjacent to the member 5 whilst the latter has a cranked outer edge 16 which on one side engages said chamfered portion 15 and on the other side receives an end of the cylinder 1 which is welded to said cranked edge 16. The flange 14 also engages one axial end of the seal 7 and the two members 4 and 5 engage each other radially outwardly of the flange 14.

I claim:
1. A gland assembly for a piston rod of a piston and cylinder unit comprising:
    a guide bush having an axially extending portion and a radially extending flange;
    a pair of annular retaining members;
    an annular flexible seal element;
    the exterior surface of said axially extending portion of said guide bush engaging the inner surface of one of said annular retaining members to locate said one retaining member;

the outer peripheral surface of said radially extending flange of the guide bush engaging a portion of the inner surface of the other retaining member;

the outer periphery of said other annular retaining member on the side thereof adjacent to said other annular retaining member is chamfered;

the outer edge of said other annular retaining member is cranked to engage on one side said chamfered part of said one retaining member and on the other side is adapted to be secured to the cylinder of said piston and said cylinder units; and said other annular retaining member having a centrally disposed dished portion to define with said radially extending flange of the guide bush a recess in which said annular flexible seal element is located.

* * * * *